M. E. CRANDALL.
AUTOMOBILE SPRING WHEEL.
APPLICATION FILED FEB. 28, 1910.
1,015,006.
Patented Jan. 16, 1912.
3 SHEETS—SHEET 3.
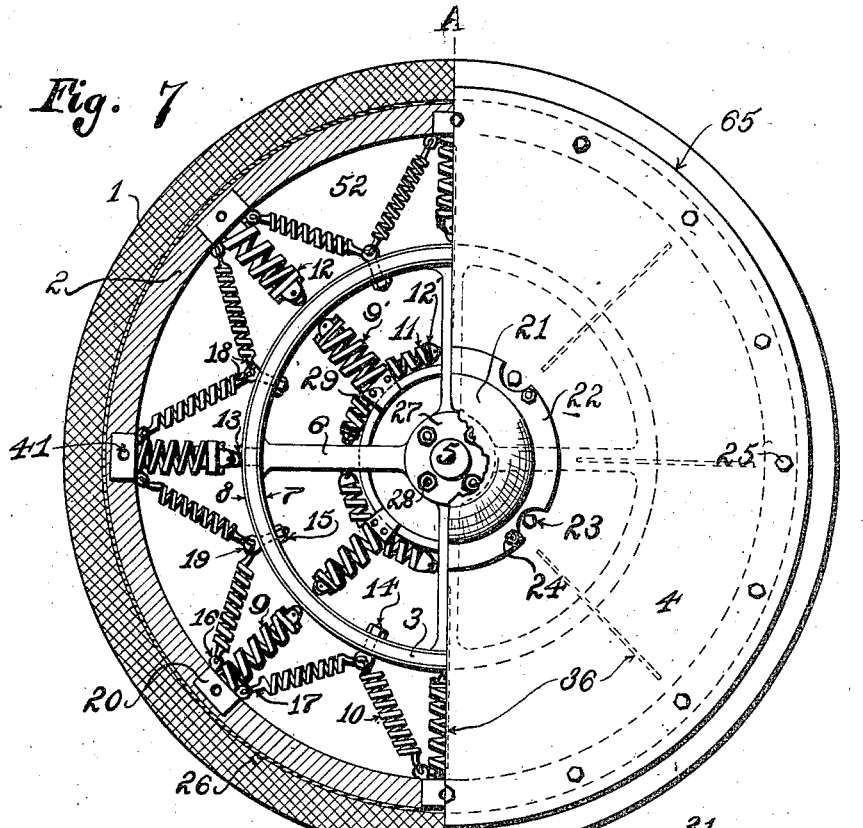
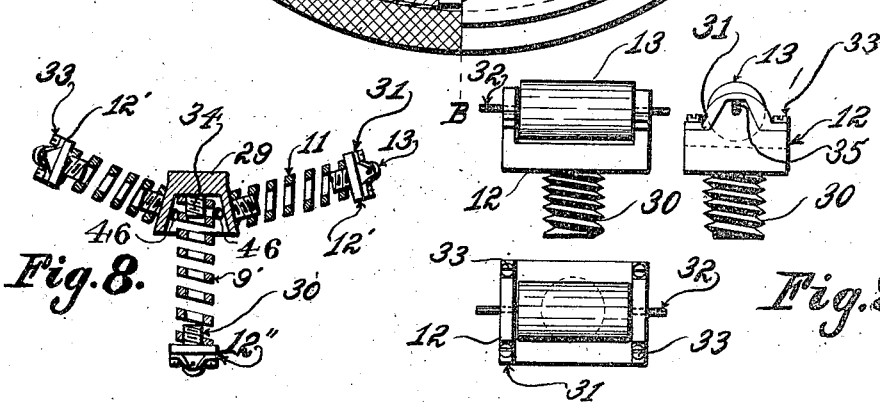
Witnesses:
Fred W. Remer
Charles F. Anderson
Inventor.
Max E. Crandall.

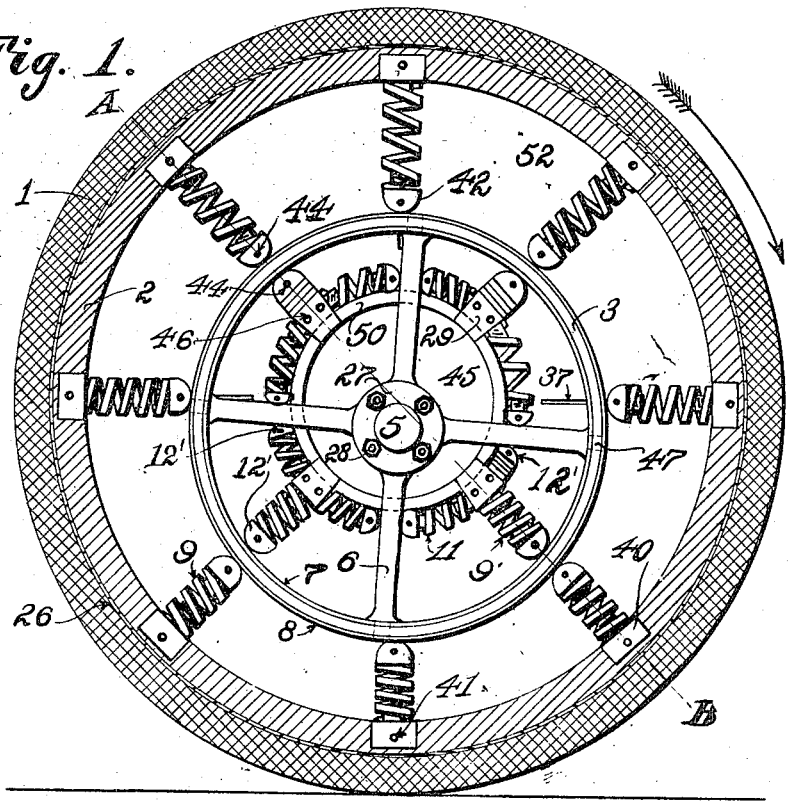

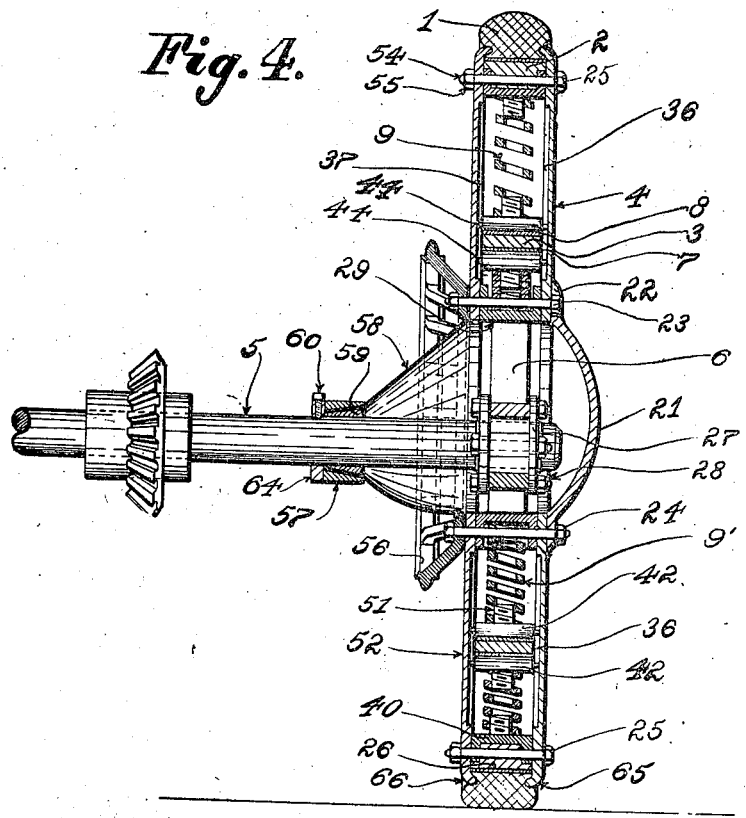

UNITED STATES PATENT OFFICE.

MAX E. CRANDALL, OF LAWTON, OKLAHOMA.

AUTOMOBILE SPRING-WHEEL.

1,015,006.

Specification of Letters Patent. Patented Jan. 16, 1912.

Application filed February 28, 1910. Serial No. 546,573.

*To all whom it may concern:*

Be it known that I, MAX E. CRANDALL, a citizen of the United States, residing at Lawton, in the county of Comanche, and State of Oklahoma, have invented new and useful Improvements in Automobile Spring-Wheels, of which the following is a specification.

This invention comprehends certain new and useful improvements in resilient wheels and tires, and the invention has for its primary object an improved construction of spring wheel which will be simple and durable and efficient in operation to absorb the shocks caused by the wheels traveling over uneven places in the road, as well as the traction shocks due to any sudden starting or stopping of the vehicle, and which will not be open to the disadvantages incidental to wheels equipped with tires of the pneumatic type.

The invention also has for its object a resilient wheel, the parts of which are effectively held together in a simple manner and are readily accessible for the purposes of repair, replacement or the like.

Another object of the invention is a resilient wheel in which the operative parts are so arranged as to effectively reduce friction and wear. And the invention also has for an object to generally improve this class of devices and to render them more commercially desirable.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a longitudinal sectional view of a wheel embodying the improvements of my invention, parts being omitted and other parts shown in side elevation the wheel being represented as under a combined load and driving tension; Fig. 2 illustrates in detail two views of an abutment head which may be employed; Fig. 3 illustrates in transverse section a portion of the outer rim of the wheel and in detail side view one of the spring holders that may be employed; Fig. 4 is a transverse sectional view of the wheel, showing in addition to the wheel itself, a portion of an axle on which the wheel is mounted and a driving device with which the wheel and axle may be equipped, the section through the wheel being taken approximately on the line A—B of Fig. 1; Fig. 5 is a detail sectional view of parts designed to hold one end of a dust sleeve, the same being shown on the axle; Fig. 6 is a fragmentary sectional perspective view of one of the spokes and the inner rim to which the outer ends of the spokes are connected; Fig. 7 is a view partly in side elevation and partly in section of another embodiment of the invention; Fig. 8 is a detail sectional view of one set of springs embodied in the wheel as illustrated in Fig. 7; and, Fig. 9 illustrates three different views of a roller abutment head which may be employed with the springs of the last mentioned embodiment of the wheel.

Corresponding and like parts are referred to in the following description and indicated in all the views of the drawings by the same reference characters.

Although it is not essential that my wheel be equipped with a cushion or other rubber tire for a tread element, as I depend upon the structure of the wheel itself to secure the desired resiliency, I have shown in the present instance a cushion tire 1 which is designed to encircle a felly 2, the inner edge of the tire preferably abutting against a ring 26 of metal and the felly 2 being reinforced by being seated within channeled spring holders 40, the said felly and ring 26 together constituting in the present instance the outer rim of the wheel. The tire 1 is preferably held clenched in between flanges 65 and 66 that are formed on the edges of side plates or circular heads 52 and 4, the marginal flanged edges of said heads or side plates projecting in a radial direction outwardly beyond the ring or band 26, as best illustrated in Fig. 3. In order to securely hold the parts in place, and yet in a detachable manner, a series of bolts 54 are passed through the side plates 52 and 4, the bolts being provided at one end with heads 25 and at the opposite ends with nuts 55, the bolts passing through openings formed in the spring holders 40 and also through the felly 2, and thereby serving to hold the parts 40 in place as well as to secure the side plates to the rim.

The spring holders 40 may be of any desired number arranged in a circumferentially extending series at preferably equal distances apart, and they are formed, as illustrated in Fig. 3, with screw threaded shanks 53 entering into and engaging the outer ends of radially disposed coiled compression springs 9. In that embodiment of the invention illustrated in Figs. 1 to 4, the inner ends of these springs 9 are similarly engaged with threaded shanks 51 that form part of abutment heads 52, said heads being preferably rounded, as best illustrated in Figs. 1 and 2 and bearing frictionally against an inner rim which is preferably composed of a main intermediate portion 3 reinforced by inner and outer rings 7 and 8. The spokes 6 are tenoned, as at 47, (see Fig. 6) in the inner rim and extend inwardly therefrom to the hub 27 which is composed of corresponding rings connected together and to the spokes by transversely extending bolts 28. The hub is directly mounted upon the spindle end of the axle 5.

The side plates 52 and 4 are formed at their center with circular openings 45, the plates defining said openings and being adapted to receive and hold the spring engaging members 29. Each of the spring engaging members 29 is formed with a radially extending and outwardly projecting threaded stem designed for engagement in an inner radially disposed compression spring 9' and with two oppositely extending circumferentially projecting threaded stems adapted for engagement with the adjoining ends of circumferentially extending compression springs 11, as best illustrated in Figs. 1 and 4. The opposite ends of the springs 11 are provided with abutment heads 42 like the abutment heads first described, the abutment heads of the springs 11 bearing frictionally against the opposite side edges of the spokes 6, as best illustrated in Fig. 1, and the springs 9' are similarly equipped on their outer ends, the abutment heads of said last named springs bearing frictionally against the inner face of the ring 7 which forms part of the inner rim.

The side plates 52 and 4 are formed on their inner faces with radially extending grooves, one set being designated 36 and the other 37, and the laterally projecting pins 44 of the abutment heads 42 of the springs 9 and 9' work in said grooves, the springs being thereby properly guided and friction reduced, it being noted that the springs 9' are set opposite the springs 9, that is, in radial alinement therewith, although it is to be understood that the invention is not limited to this particular relative arrangement of the radially disposed springs.

Bolts 23 and 24 pass transversely through openings 46 formed in the spring engaging members 29, the bolts 23 passing merely through the side plates 52 and 4 and accommodated in marginal notches formed in the flange 22 of a dust cap 21, while the bolts 24 pass also through the flange 22 of the dust cap and thereby securely hold the latter in place. It will thus be seen that the dust cap can be easily removed by simply unscrewing the nuts of the bolts 24 and without disturbing the bolts 23 or releasing the members 29. Both sets of bolts pass through and hold to the inner side of the sprocket wheel 56. A dust excluding sleeve 58 of any flexible material or substance is clamped between the plate 52 and the hub of the sprocket wheel 56, said sleeve being also clamped between collar members 57 and 59 mounted on the axle 5, the inner collar member 59 being adapted to wedge into the collar member 57. The member 59 may be secured to the axle as by a key 63, and the collar member 57 may abut against a ring or collar 64 secured to the axle 5 by a set screw 60.

From as much of the description as has preceded, together with the accompanying drawings, particularly Figs. 1 to 4, it will be understood that any radial stress or shock on the tread surface of the wheel will be taken up and absorbed by the radially disposed springs, while any traction pull or stress will be taken care of particularly by the springs 11, this being clearly illustrated in Figs. 1 and 4, which indicates that the wheel is turning in the direction of the arrow displayed in juxtaposition to the periphery of the tire 1.

It is to be understood that my invention is not limited to the exact construction and arrangement of the parts illustrated in Figs. 1 to 4, but that changes may be made, as for instance where the wheel is intended for more than ordinarily heavy vehicles, and where also it is designed to reduce even the slight friction between the abutment heads of the springs, the inner rim and the spokes. For instance, as illustrated in Fig. 7, certain changes or modifications may be made. In this embodiment of the invention, the holders (designated 20) for the outer ends of the outermost radial springs 9, are provided with apertured ears 16 to engage hooks 17 formed on the outermost ends of obliquely extending contractile springs 10. These springs in the present instance are arranged in pairs between every two springs 9, and they converge inwardly toward each other, their inner ends being joined together by a common eye 19, the eyes 19 being formed on the outer ends of bolts 14 which pass through the inner rim and are secured thereto by nuts 15. The spring engaging members 29 before described are also provided, in this form of the device, with threaded stems 34 to engage the respective springs 9' and 11, but the abutment heads, the stems 30 of which engage the respective springs, are provided with rollers 13. These rollers 13 have trunnion ends 32 which work in the grooves 36—37 formed in the inner faces of the side plates of the wheel, the trunnions being received in bearings formed in the body portions 12 of the abutments and springs 35 pressing inwardly upon the trunnions so as to yieldingly mount them in their bearings. The trunnions are retained in place by bearing straps 31 secured to the body portion 12 by stud screws 33. It will thus be understood that the main difference between this embodiment of the invention and that illustrated in Figs. 1 to 4, is that the former employs the contractile springs 10 in addition to the other springs, and that the abutment heads of the former springs are provided with rollers. The abutment heads for the springs 11 illustrated in Fig. 8, are designated 12′ and the abutment head for the spring 9′, as illustrated in Fig. 8, is designated 12″.

Having thus described the invention, what is claimed as new is:

1. A wheel of the character described, comprising an outer rim, an inner rim spaced from the outer rim, side plates connected to the outer rim and provided in their inner faces with radial grooves, spring holders connected to said outer rim and projecting inwardly therefrom, the said spring holders being formed with radially disposed inwardly projecting threaded stems, coiled compression springs secured at their outer ends around said stems and projecting radially therefrom, an abutment head connected to the inner end of each of said springs and bearing upon said inner rim, each of said abutment heads being provided with laterally projecting pins movably engaging in the radial grooves of the plates.

2. A wheel of the character described, comprising an outer rim, an inner rim spaced from the outer rim, side plates secured to the outer rim and extending centrally beyond the inner rim, compression springs interposed between the inner and outer rims and bearing against the same, the said springs being secured to one of said rims and frictionally engaging the other rim, spring engaging members carried by the side plates within the circle of the inner rim, radially disposed compression springs secured to said members and bearing frictionally against the inner rim, spokes connected to the inner rim and extending inwardly therefrom, a hub connected to the inner ends of said spokes, and compression springs bearing against said spring engaging members and provided with abutment heads engaging the spokes.

3. A wheel of the character described, comprising an outer rim, an inner rim, resilient devices interposed between said rims and bearing against the same, spokes extending inwardly from the inner rim, a hub connected to the inner ends of said spokes, side plates connected to the outer rim, spring engaging members carried by said side plates, radially extending compression springs secured to said side plates and extending outwardly therefrom and bearing against the inner edge of the inner rim, and oppositely extending circumferential compression springs carried by said spring engaging members and provided at their ends with rollers bearing against the opposite edges of said spokes.

In testimony whereof I affix my signature in presence of two witnesses.

MAX E. CRANDALL.

Witnesses:
C. C. CLARK,
FRED W. REMET.